(12) United States Patent
Wang et al.

(10) Patent No.: US 12,254,631 B2
(45) Date of Patent: Mar. 18, 2025

(54) DUAL-LEVEL MODEL FOR SEGMENTATION

(71) Applicant: Lemon Inc., Grand Cayman (KY)

(72) Inventors: Peng Wang, Los Angeles, CA (US);
Xueqing Deng, Los Angeles, CA (US);
Xiaochen Lian, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 509 days.

(21) Appl. No.: 17/585,301

(22) Filed: Jan. 26, 2022

(65) Prior Publication Data

US 2023/0237662 A1 Jul. 27, 2023

(51) Int. Cl.
*G06T 7/11* (2017.01)
*G06T 3/40* (2024.01)

(52) U.S. Cl.
CPC .......... *G06T 7/11* (2017.01); *G06T 3/40* (2013.01); *G06T 2207/20084* (2013.01); *G06T 2207/20132* (2013.01)

(58) Field of Classification Search
None
See application file for complete search history.

(56) References Cited

PUBLICATIONS

Guided Curriculum Model Adaptation and Uncertainty-Aware Evaluation for Semantic Nighttime Image Segmentation (Year: 2019).*
International Patent Application No. PCT/SG2023/050031; Int'l Search Report and the Written Opinion; dated Aug. 2, 2023; 9 pages.
Sakaridis et al.; "Guided Curriculum Model Adaptation and Uncertainty-Aware Evaluation for Semantic Nighttime Image Segmentation"; IEEE/CVF Int'l Conf. on Computer Vision; 2019; p. 7374-7383.
Cao et al.; "Box-level segmentation supervised deep neural networks for accurate and real-time multispectral pedestrian detection"; ISPRS Journal of Photogrammetry and Remote Sensing; vol. 150; Apr. 2019; p. 70-79.
Mostajabi et al.; "Feedforward semantic segmentation with zoom-out features"; IEEE Conf. on Computer Vision and Pattern Recognition; 2015; p. 3376-3385.
Chen et al.; "Encoder-Decoder with Atrous Separable Convolution for Semantic Image Segmentation"; European Conf. on Computer Vision; 2018; p. 801-818.
Open-mmlab / mmsegmentation; https://github.com/open-mmlab/mmsegmentation; GitHub; accessed Apr. 25, 2022; 7 pages.

(Continued)

*Primary Examiner* — Dov Popovici
(74) *Attorney, Agent, or Firm* — BakerHostetler

(57) ABSTRACT

The techniques for dual-level semantic segmentation are provided. Data may be input to a first segmentation network. The input data comprises an image and label information associated with the image. The image may be captured at nighttime and may comprise a plurality of regions. At least one region among the plurality of regions may be determined based at least in part on output of the first segmentation network. The at least one region of the image may be cropped. The cropped at least one region may be input to a second segmentation network. A final output may be produced based on the output of the first segmentation network and output of the second segmentation network.

17 Claims, 13 Drawing Sheets

(56) References Cited

PUBLICATIONS

Dai et al.; "Deformable Convolutional Networks"; IEEE Int'l Conf. on Computer Vision; 2017; p. 764-773.
Dosovitskiy et al.; "An Image is Worth 16x16 Words: Transformers for Image Recognition at Scale"; Computer Vision and Pattern Recognition; arXiv:2010.11929; Jun. 2021; 22 pages.
Fu et al.; "Dual Attention Network for Scene Segmentation"; IEEE/CVF Conf. on Computer Vision and Pattern Recognition; 2019; p. 3146-3154.
Isola et al.; "Image-To-Image Translation With Conditional Adversarial Networks"; IEEE Conf. on Computer Vision and Pattern Recognition; 2017; p. 1125-1134.
Liu et al.; "Single-Image HDR Reconstruction by Learning to Reverse the Camera Pipeline"; IEEE/CVF Conf. on Computer Vision and Pattern Recognition; 2020; p. 1651-1660.
Liu et al.; "Swin Transformer: Hierarchical Vision Transformer Using Shifted Windows"; IEEE/CVF Int'l Conf. on Computer Vision; 2021; p. 10012-10022.
Ren et al.; "Faster R-CNN: Towards Real-Time Object Detection with Region Proposal Networks"; Advances in Neural Information Processing Systems; vol. 28; 2015; p. 91-99.
Tan et al.; "Night-time semantic segmentation with a large real dataset"; arXiv:2003.06883; Mar. 2020; 13 pages.
Tsai et al.; "Learning to Adapt Structured Output Space for Semantic Segmentation"; IEEE Conf. on Computer Vision and Pattern Recognition; 2018; p. 7472-7481.
Wang et al.; "Deep High-Resolution Representation Learning for Visual Recognition"; IEEE Transactions on Pattern Analysis and Machine Intelligence; vol. 43; Mar. 2020; 23 pages.
Wu et al.; "DANNet: A One-Stage Domain Adaptation Network for Unsupervised Nighttime Semantic Segmentation"; IEEE/CVF Conf. on Computer Vision and Pattern Recognition; 2021; p. 15769-15778.
Xiao et al.; "Unified Perceptual Parsing for Scene Understanding"; European Conf. on Computer Vision; 2018; p. 418-434.
Yu et al.; "BDD100K: ADiverse Driving Video Database with Scalable Annotation Tooling"; arXiv:1805.04687; May 2018; 16 pages.
Zhao et al.; "Pyramid Scene Parsing Network"; IEEE Conf. on Computer Vision and Pattern Recognition; 2017; p. 2881-2890.
Zhu et al.; "Unpaired Image-To-Image Translation Using Cycle-Consistent Adversarial Networks"; IEEE Int'l Conf. on Computer Vision; 2017; p. 2223-2232.

* cited by examiner

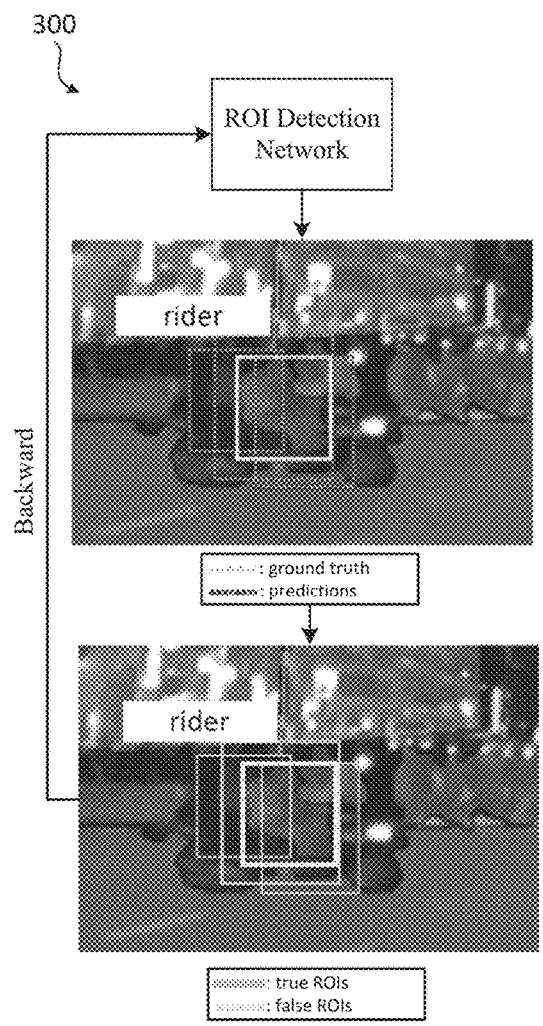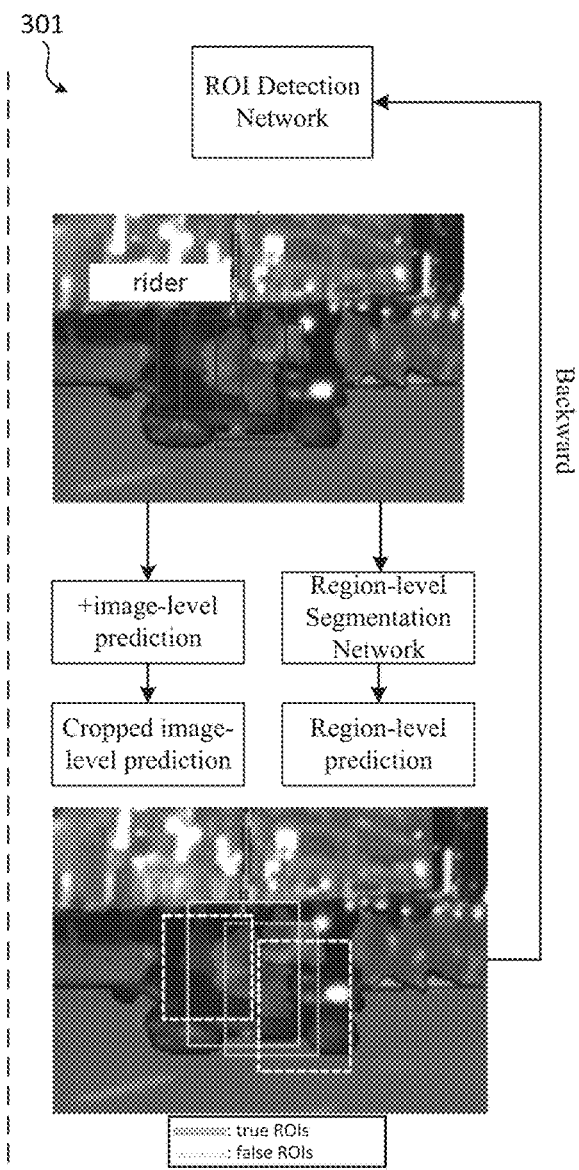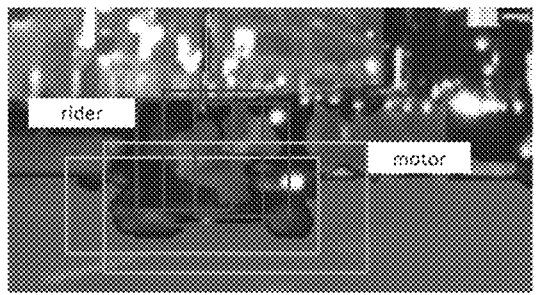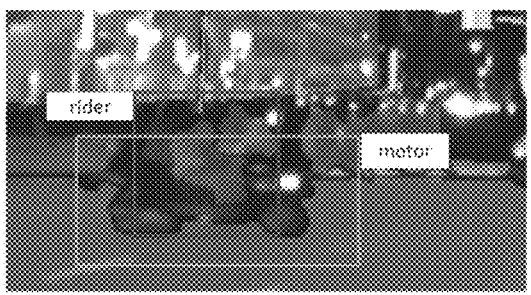
FIG. 3A   FIG. 3B

900

| (a) Nightcity | | | | |
|---|---|---|---|---|
| Network | Backbone | Resolution | Nightcity | +Citys |
| NightCity [ ] | Res101 | 512x1024 | 51.5 | 53.9 |
| PSPNet [ ] | Res101 | 512x1024 | 54.75 | 56.89 |
| PSPNet [ ] | Res101 | 1024x2048 | 55.64 | 57.52 |
| DeeplabV3+ [ ] | Res101 | 512x1024 | 54.21 | 58.29 |
| DeeplabV3+ [ ] | Res101 | 1024x2048 | 54.47 | 59.03 |
| UPerNet [ ] | Swin-Base | 512x1024 | 57.71 | 59.35 |
| HRNetV2 [ ] | HRNet-W48 | 1024x2048 | 55.89 | 58.49 |
| DANet [ ] | Res101 | 1024x2048 | 55.98 | 57.72 |
| UPerNet [ ] | Res101 | 1024x2048 | 55.81 | 56.98 |
| UPerNet [ ] | ViT | 1024x2048 | 57.13 | 58.07 |
| UPerNet [ ] | Swin-Base | 1024x2048 | 58.25 | 59.67 |
| Ours(DeeplabV3+) | Res101 | 1024x2048 | 56.21 | 57.41 |
| baseline [ ] | Swin-Base | 1024x2048 | 59.25 | 60.37 |
| Ours(UPerNet) | Swin-Base | 1024x2048 | 58.85 | 61.09 |
| Ours(UPerNet+DefConv) | Swin-Base | 1024x2048 | 60.27 | 62.01 |
| +lighting | Swin-Base | 1024x2048 | 60.73 | 62.34 |

| (b) BDD100k | | | | |
|---|---|---|---|---|
| Network | Backbone | Resolution | BDD-N | BDD100k |
| PSPNet [ ] | Res101 | 720x1280 | 29.96 | 46.24 |
| HRNetV2 [ ] | HRNet-W48 | 720x1280 | 29.86 | 44.32 |
| DANet [ ] | Res101 | 720x1280 | 29.46 | 42.64 |
| DeeplabV3+ [ ] | Res101 | 720x1280 | 30.11 | 43.44 |
| UPerNet [ ] | Res101 | 720x1280 | 30.88 | 47.68 |
| UPerNet [ ] | ViT | 720x1280 | 30.74 | 47.81 |
| UPerNet [ ] | Swin-Base | 720x1280 | 31.74 | 48.04 |
| Ours(DeeplabV3+) | Res101 | 720x1280 | 31.27 | 45.11 |
| Baseline [ ] | Swin-Base | 720x1280 | 32.37 | 48.52 |
| Ours(UPerNet) | Swin-Base | 720x1280 | 34.17 | 49.21 |
| Ours(UPerNet+DefConv) | Swin-Base | 720x1280 | 35.13 | 50.81 |
| +lighting | Swin-Base | 720x1280 | 35.41 | 51.24 |

| Method | Backbone | FPN | Decode head | Nightcity | +Citys |
|---|---|---|---|---|---|
| UPerNet [ ] | Res101 | Conv2D | Conv2D | 55.81 | 59.03 |
| Ours | Res101 | Conv2D | DefConv [ ] | 56.31 | 59.33 |
| Ours | Res101 | DefConv [ ] | DefConv [ ] | 56.54 | 59.85 |
| UPerNet [ ] | Swin-Base | Conv2D | Conv2D | 58.25 | 59.67 |
| Ours | Swin-Base | Conv2D | DefConv [ ] | 58.68 | 59.99 |
| Ours | Swin-Base | DefConv [ ] | DefConv [ ] | 59.25 | 60.37 |

| Network | $\Phi_B$ replacement boxes proposal method | mIoU(%) |
|---|---|---|
| UPerNet-Swin | No replacement | 60.37 |
| | + $\Phi_I$ prediction boxes | 61.11 (+0.77) |
| | + RDN proposals | 61.51 (+1.17) |
| | + SeRDN proposals | 62.01 (+1.67) |
| DeeplabV3+ | No replacement | 59.03 |
| | + $\Phi_I$ prediction boxes | 59.91 (+0.88) |
| | + RDN proposals | 60.35 (+1.32) |
| | + SeRDN proposals | 60.63 (+1.60) |

FIG. 10B

| Method | Approach | Input resolution | Network | NightCity | Night+City | BDD100k Night | BDD100k |
|---|---|---|---|---|---|---|---|
| NightCity [ ] | Exposure-Aware Segmentation | 512x1024 | ResNet | 51.8 | 53.9 | - | 48.52 |
| UPerNet [ ] | Segmentation | 512x1024 | UPerNet-Swin | 57.71 | 59.35 | 31.74 | - |
| UPerNet [ ] | Segmentation | 1024x2048 | UPerNet-Swin | 58.25 | 59.67 | - | - |
| Pix2PixHD [ ] | Translation | 512x1024 | UPerNet-Swin | 45.38 | 49.74 | 27.14 | 39.67 |
| CycleGAN [ ] | Translation | 512x1024 | UPerNet-Swin | 46.62 | 51.98 | 28.69 | 39.84 |
| SingleHDR [ ] | Enhancement | 512x1024 | UPerNet-Swin | 57.07 | 58.99 | - | - |
| DANNet [ ] | Domain Adaptation | 512x1024 | UPerNet-Swin | - | 59.41 | - | 48.25 |
| AdaptSeg [ ] | Domain Adaptation | 512x1024 | UPerNet-Swin | - | 58.77 | - | 48.32 |
| Ours (baseline) | Segmentation | 512x1024 | UPerNet-Swin-DefConv | 59.25 | 60.37 | 32.37 | 48.52 |
| Ours (baseline) | Segmentation | 1024x2048 | UPerNet-Swin-DefConv | 58.99 | 60.48 | 32.88 | 49.05 |
| Ours (+ lighting) | Adapt-Segmentation | 1024x2048 | UPerNet-Swin-DefConv | 59.94 | 61.11 | 32.78 | 49.11 |
| Ours (+ seeing boxes) | Dual-segmentation | 1024x2048 | UPerNet-Swin-DefConv | 60.15 | 61.53 | 34.69 | 50.37 |
| Ours (+ REN proposals) | Dual-segmentation | 1024x2048 | UPerNet-Swin-DefConv | 60.27 | 62.01 | 35.13 | 50.81 |
| Ours (+ ScRDN proposals) | Dual-segmentation | 1024x2048 | UPerNet-Swin-DefConv | 60.73 | 62.34 | 35.41 | 51.34 |

FIG. 11

| Method | road | side. | build. | wall | fence | pole | light | sign | vege | terr. | sky | pers | rider | car | truck | bus | train | mcto | bicy | mIoU |
|---|---|---|---|---|---|---|---|---|---|---|---|---|---|---|---|---|---|---|---|---|
| UPerNet-Swin | 91.7 | 52 | 84.5 | 58.4 | 58.9 | 35.1 | 34.9 | 56.7 | 61.9 | 29.5 | 87.9 | 56.1 | 57.5 | 82.5 | 65.2 | 74.8 | 58.2 | 39 | 58.4 | 57.71 |
| SingleHDR | 90.8 | 51.73 | 83.12 | 59.01 | 53.44 | 34.85 | 34.16 | 57.11 | 60.41 | 27.53 | 86.52 | 55.38 | 34.02 | 80.92 | 66.49 | 73.23 | 57.88 | 38.99 | 38.71 | 57.07 |
| Pix2PixHD | 85.93 | 33.51 | 68.81 | 49.97 | 42.86 | 27.04 | 13.75 | 34.6 | 47.91 | 20.08 | 82.79 | 35.49 | 12.13 | 72.71 | 53.47 | 58.33 | 42.55 | 17.32 | 24.9 | 43.38 |
| CycleGAN | 87.03 | 39.16 | 77.02 | 45.35 | 44.23 | 23.54 | 14.97 | 35.39 | 46.12 | 18.68 | 84.13 | 39.85 | 10.83 | 75.28 | 54.85 | 61.07 | 43.04 | 19.78 | 26.63 | 44.62 |
| Ours (baseline) | 91.7 | 57.5 | 84 | 58.1 | 55.3 | 41.9 | 58.7 | 60.1 | 61.4 | 29.2 | 88.1 | 60 | 39 | 83.8 | 66.1 | 75.7 | 56.4 | 38.2 | 47.1 | 59.25 |
| Ours (+Proposals) | 92.53 | 55.09 | 85.35 | 59.6 | 58.27 | 41.16 | 34.81 | 63.23 | 63.42 | 27.88 | 88.86 | 61.84 | 38.95 | 85.98 | 67.35 | 79.91 | 64.95 | 43.28 | 48.66 | 61.11 |
| Ours (+SemSegBox) | 92.57 | 55.21 | 85.36 | 56.48 | 58.33 | 41.04 | 33.97 | 63.01 | 63.48 | 27.81 | 88.84 | 62.03 | 41.03 | 86.12 | 67.39 | 79.94 | 64.81 | 45.71 | 54.03 | 61.71 |

DUAL-LEVEL MODEL FOR SEGMENTATION

BACKGROUND

Image segmentation is a sub-domain of computer vision and digital image processing. Image segmentation is an important technique and has many applications, such as robotic navigation, localization, and scene understanding. However, conventional image segmentation techniques have many shortcomings. Therefore, improvements in image segmentation techniques are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3A shows an exemplary model for a region detection network.

FIG. 3B shows an exemplary model for a region-level segmentation guided region detection network.

FIG. 9 shows a table illustrating performance results associated with a dual-level model for segmentation.

FIG. 10A shows another table illustrating performance results associated with a dual-level model for segmentation.

FIG. 10B shows another table illustrating performance results associated with a dual-level model for segmentation.

FIG. 11 shows another table illustrating performance results associated with a dual-level model for segmentation.

FIG. 12 shows another table illustrating performance results associated with a dual-level model for segmentation.

DETAILED DESCRIPTION OF ILLUSTRATIVE EMBODIMENTS

Understanding autonomous driving scenes is a fundamental computer vision task (i.e., semantic segmentation). Many existing segmentation techniques focus on segmentation of daytime images. Such daytime images often contain a lot of clear environmental information, such as rich texture and color. However, existing segmentation techniques do not work well for nighttime images. Such nighttime images often do not contain a lot of clear environmental information due to the dark environment. As a result, semantic segmentation of nighttime scenes is a challenge. Unlike daytime datasets (e.g., Cityscapes, KITTI, etc.), nighttime datasets are limited. Of those that exist, few are annotated with pixel-wise ground truths. Existing nighttime datasets consist of a large volume of unlabeled data, which means that only images are provided are in the datasets.

While some segmentation techniques focus on unsupervised learning between daytime and nighttime data, many of these methods fail to provide feasible solutions in instances where annotated data is available. For example, a recently proposed nighttime dataset, NightCity, provides a large number of real-world images with full annotations. The techniques described herein utilize such annotated data within a dual-level model to perform semantic segmentation, such as nighttime semantic segmentation, in a standard supervised manner. For example, the techniques described herein allow nighttime semantic semination to be performed in a similar manner to daytime semantic segmentation.

Figure 1:
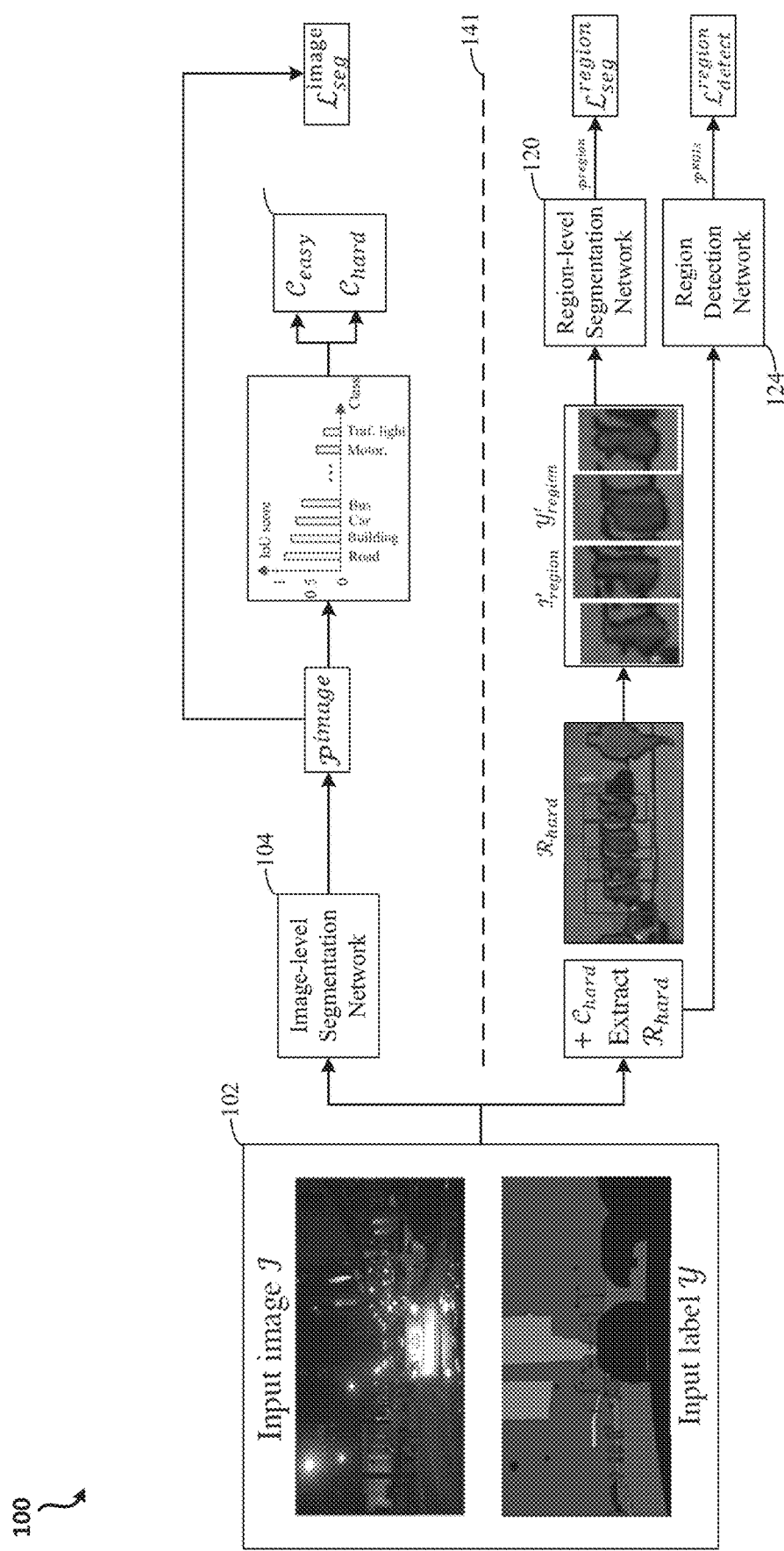
FIG. 1 shows an example dual-level model for segmentation.

FIG. 1 shows an example dual-level model 100 for segmentation. The dual-level model 100 can be used to perform nighttime semantic semination techniques in a standard supervised manner. As described above, nighttime semantic segmentation is difficult because, unlike daytime images that have clear appearances that can be encoded to rich features, nighttime images lack information and are therefore more difficult to encode to rich features. Some regions (hereinafter referred to as "easy regions") within a nighttime image can be correctly recognized at night, as the image may not be completely dark. In some instances, even, the majority of regions of a nighttime image are easy regions. However, the remaining regions (hereinafter referred to as "hard regions") may often be too difficult to recognize. These easy and hard regions may be associated to specific classes. For example, some small object classes, motorcycle, etc. The dual-level model 100 is configured to balance the easy and hard regions for nighttime data. The model 100 has two levels of granularity for tackling contextual variants. For example, the model 100 has an image level, depicted above the dashed line 141, and a region level, depicted below the dashed line 141.

The image-level includes an image-level segmentation network 104. The image-level segmentation network 104 can be denoted as $\Phi_I$. The image-level segmentation network 104 may be optimized first in order to obtain predictions to split the classes into easy region and hard region categories. For example, the image-level segmentation network 104 may be utilized to determine the score maps $P \in \mathbb{R}^{H \times W}$ associated with an entire image set (such as a nighttime image set). Given the input 102, where the input 102 includes an image set (denoted by $i \in \mathbb{R}^{H \times W \times 3}$) and a label or annotation mask set (denoted by $Y \in \mathbb{R}^{H \times W}$) associated with the image set, a standard supervised training pipeline may be used to optimize the image-level segmentation network 104. The score map determined by feeding a whole image $I_i$ from the image set through the image-level segmentation network 104 can be denoted as $P_i$. Thus, the objective function of the image-level segmentation network 104 can be represented by the following:

$$L_{seg}^I \sum_{P_i \in \mathbb{P}, Y_i \in Y} CE(P_i, Y_i) \qquad \text{Equation 1}$$

where CE denotes the 2D cross entropy loss, $P_i = \Phi_I(I_i)$.

The techniques performed by the image-level segmentation network 104 are standard semantic segmentation techniques. However, due to the low visibility in nighttime images, nighttime semantic segmentation is more challenging. With the same segmentation network architecture, a nighttime dataset yields much poorer performance compared to a daytime dataset. While image translation can generate day-style images for the nighttime data, it also causes distortion, which results in poor local features. The local distortion decreases the performances for small object classes. As a result, extra components may need to be integrated into the model 100 to improve the model 100. Because the image-level segmentation network 104 is able to predict most of the regions correctly, another network level, the region level depicted below the dashed line 141, focuses on the hard regions without considering the whole image.

The region level includes a region level segmentation network 120. The region level segmentation network 120 can be denoted as $\Phi_R$. In order to train the region level segmentation network 120, the hard regions from images extracted. These hard regions may be extracted using the semantic label masks. The semantic classes C can be split into easy $C_{easy}$ and hard $C_{hard}$. Regions associated with $C_{easy}$ can be predicted through the image-level segmentation network 104, while those associated with $C_{hard}$ can be fed through the region level segmentation network 120. The results can then be merged. For example, the predictions from image-level segmentation network 104 may first be evaluated and, later, the evaluation scores may be ranked to find $C_{hard}$. Once these classes are determined, the regions associated with $C_{hard}$ can be grouped into instances and then the bounding boxes of the instances can be used to crop the images.

For example, once $C_{hard}$ is obtained, a region detection network 124 of the region level can use the to extract the regions of interest (ROIs) by grouping the classes. The region detection network 124 may be denoted as $\Theta_R$. Semantic label maps may be utilized to create ROIs, but the issue with this is that ground truth is not available at inference. Instead, prediction from the image level segmentation network 104 must be used. Because the image level segmentation network 104 performs poorly with $C_{hard}$, the image level segmentation network 104 may miss some ROIs. It is also difficult to crop the region context with inaccurate prediction boundaries. Utilizing the region detection network 124 to determine and extract the ROIs remedies these shortcomings.

Figure 2:
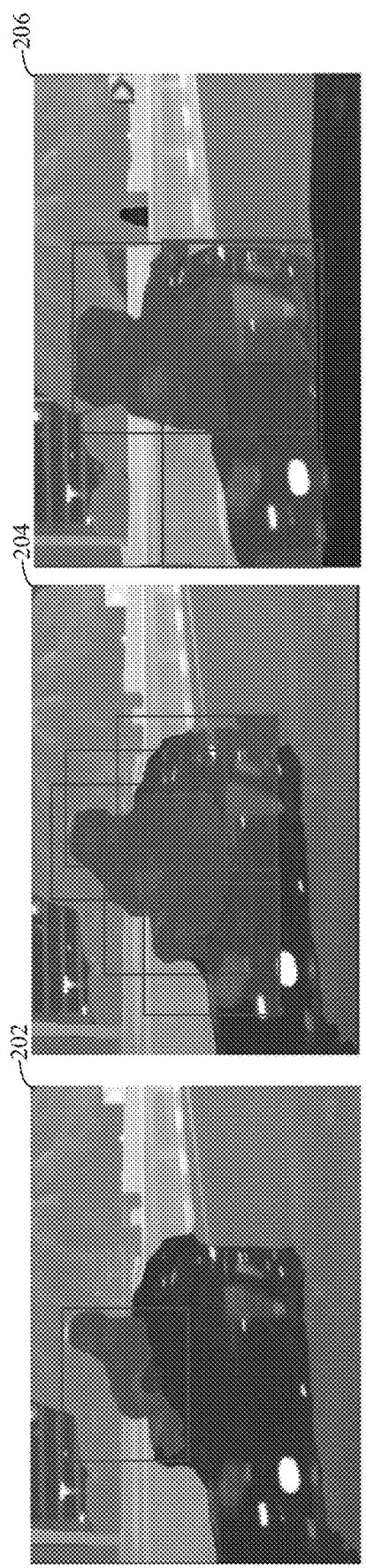
FIG. 2 shows exemplary regions of interest.

FIG. 2 shows a comparison of exemplary ROIs created utilizing prediction label maps with ROIs created by the region detection network 124. The mask 202 shows a prediction from the image level segmentation network 104 and ROIs created utilizing this prediction. The mask 204 shows merged ROI results from the image level segmentation network 104 and the region detection network 124. The mask 206 shows a ground truth mask and its ROIs (classes of interest: rider and motorcycle. The boxes denote the ROIs. The boxes indicating the ROIs may be cropped. However, as shown in FIG. 2, the motorcycle is missing as a ROI in the mask 202, as only shown ROI is shown for the rider. Additionally, ROI shown for the rider in the mask 202 does not even cover the complete rider mask. Utilizing the region detection network 124 to detect the ROIs allows for the elimination of the prediction mask from the image level segmentation network 104 to crop images for region level segmentation network 120. The improved outcome is shown by mask 206, which shows that the region detection network 124 detects $C_{hard}$ (rider and motorcycle) and creates multiple ROIs.

Referring back now to FIG. 1, the cropped bounding boxes and their corresponding class based on the semantic level mask can serve as the bounding box annotations to train the region detection network 124, of which inputs are the whole images. The objective functions of the region detection network 124, $L_{det}^R$, consist of regression and classification losses. $L_{det}^R$ is represented as follows:

$$L_{det}^R = L_{reg}^R L_{cls}^R \qquad \text{Equation 2}$$

$$L_{reg}^R = \Sigma_k^M CE|t_k - \hat{t}_k| \qquad \text{Equation 3}$$

where $L_{reg}^R$ is a smooth L1 loss for regression computed based on the coordinates of the annotation bounding boxes $t_k \in T$ and predicted ROIs $\hat{t}_k \in \hat{T}$. M denotes the total number of ROIs. Additionally, $L_{cls}^R$ is represented as follows:

$$L_{cls}^R = \Sigma_k^M CE(p_k, y_k) \qquad \text{Equation 4}$$

where $y_k \in \Upsilon$ denotes the classification label for the box derived from semantic label mask, and $p_k$ denotes the classification prediction. Finally, with non-maximum suppression, around 10 proposals may be kept for each image.

In embodiments, once the boxes indicating the ROIs are cropped, the boxes (e.g., cropped images) may be zoomed-in and fed through the region level segmentation network 120 to optimize it. The region level segmentation network 120 adopts the same network architecture as the image level segmentation network 104 and can be initialized with the weights from the image level segmentation network 104. The objective of the region level segmentation network 120 is to train segmentation on cropped images as follows:

$$L_{seg}^R = \Sigma I'_j \in i_R, Y'_j \in \Upsilon_R CE(\Phi_R(I'_j), Y'_j) \qquad \text{Equation 5}$$

where $i_R$ and $\Upsilon_R$ represent the cropped images and their semantic label masks sets, respectively. CE denotes the cross-entropy loss. The results from the region level segmentation network 120 and the image level segmentation network 104 may finally be merged.

In embodiments, even though the region detection network 124 is able to detect the ROIs of $C_{hard}$, the region detection network 124 may not be able to identify the window sizes of the ROIs to help find better context for region level segmentation network 120. Finding the appropriate contexts of the cropped regions is important, as the nighttime objects in a dark environment can barely be accurately estimated because the appearances are unclear. Having the contextual information can help perform dense predictions. To remedy this, the region level segmentation network 120 may be leveraged to modify the region detection network 124 in order to automatically learn the contexts for segmenting cropped regions.

FIGS. 3A-3B illustrate a comparison of results of ROIs generated by the region detection network 124 using a segmentation mask with ROIs generated by region-level segmentation guided region detection network (SeRDN). For example, as shown in the diagram 300 of FIG. 3A, utilizing the region-level segmentation network to help train the region detection network 124 can facilitate the production of ROIs that cover the complete objects with contexts from $C_{hard}$. However, with the region detection network 124 only, multiple ROIs that have overlaps are predicted to cover only parts of one object. The diagram 301 of FIG. 3B shows the details of the SeRDN. In order to make the region detection network 124 predict ROIs with rich context for segmentation, the region level segmentation network 120 may be used to reassign the labels. The images may first be cropped by the ROI outputs from the region detection network 124. The cropped images may later be fed through the region level segmentation network 120. The image level segmentation mask predictions $P_j$ may be pulled, and they may be cropped by the same ROI box(es). Thus, $P_j^{image}$ and $P_j^{region}$ (denoting the box) can be evaluated then compared. Afterwards, it can be determined if the proposed ROIs are performing better segmentation on the region-level network as compared to the image level network. Then the new label p∈0, 1 may be created based on the above results followed by the rule shown below:

$$v'_i = \begin{cases} 1, & iou(P^R_j, Y^R_i) > iou(P^I_j, Y^I_j) \\ 0, & \text{otherwise} \end{cases} \quad \text{Equation 6}$$

where $V=\{y'_n\}_{i=0}^M$.

The new class labels $Y^{box}$ by Y' may then be generated. The classification loss may be changed as follows:

$$L_{cls}^R = CE(y^{box}, \hat{y}) \quad \text{Equation 7}$$

where the bounding box $\hat{t}$ generated by the region detection network 124 is represented as {x, y, w, h} where x, y, w, and h denote the box's center coordinates and its width and height. Even though the class labels are changed, the bounding box regression may be optimized as well.

The model 100 described herein may be trained and tested. To train the model 100, the objective functions may be as follows:

$$L = \lambda_{is}L'_{seg} + \lambda_{rs}L_{seg}^R + \lambda_{rd}L_{det}^R \quad \text{Equation 8}$$

where $\lambda_{is}$, $\lambda_{rs}$, and $\lambda_{rd}$ are the hyperparameters to control the weights of three parts of the objectives.

To summarize, the model 100 consists of three networks as shown in FIG. 1. Two pathways are utilized to make the model 100 see clearly at night. An extra region-level pathway is utilized to discover the ROIs first by the region detection network 124 and later the region level segmentation network 120 may be used to predict the segmentation mask of those ROIs. The model 100 can use any semantic segmentation network. For example, a network architecture with backbone of a vision transformer (e.g., Swin-transformer) may be used to advance the multi-scale features for better context. The model 100 utilizes a strong baseline network architecture for handling multi-scale contextual information. The regular conv2d may be replaced with deformable convolution for multiscale context in the decode head and the feature fusion.

Figure 4:
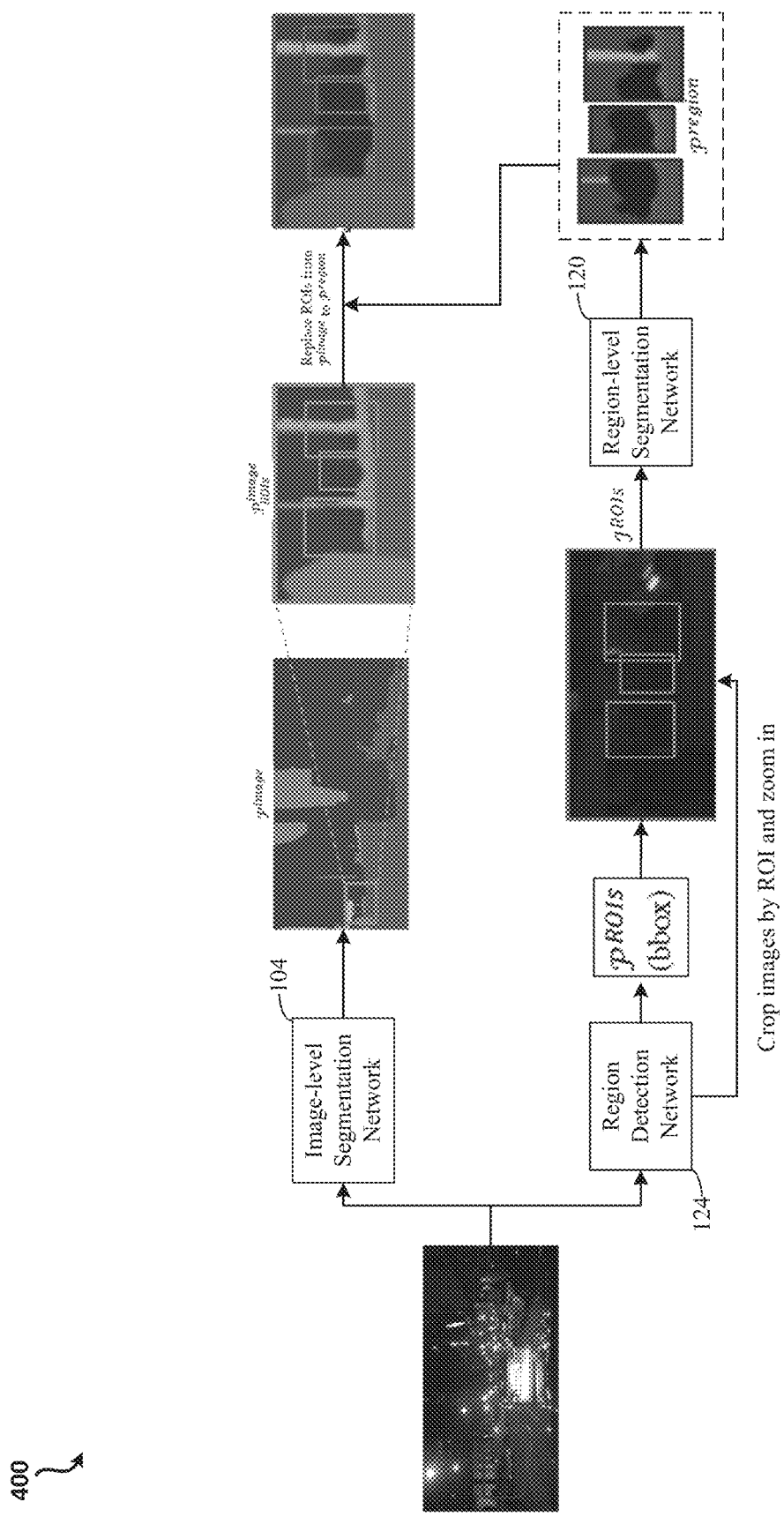
FIG. 4 shows a diagram illustrating deployment of a dual-level model for segmentation.

FIG. 4 illustrates deployment of the model 100 for inference. Different from training where the region level segmentation network 120 and the region detection network 124 can be trained at the same time, at inference, the model 100 may first get the ROIs from the region detection network 124 then crop the images by the ROIs to feed through the region level segmentation network 120. Then the prediction PR of the region level segmentation network 120 may be replaced back to $P_I$ of the image-level segmentation network 104.

Figure 5:
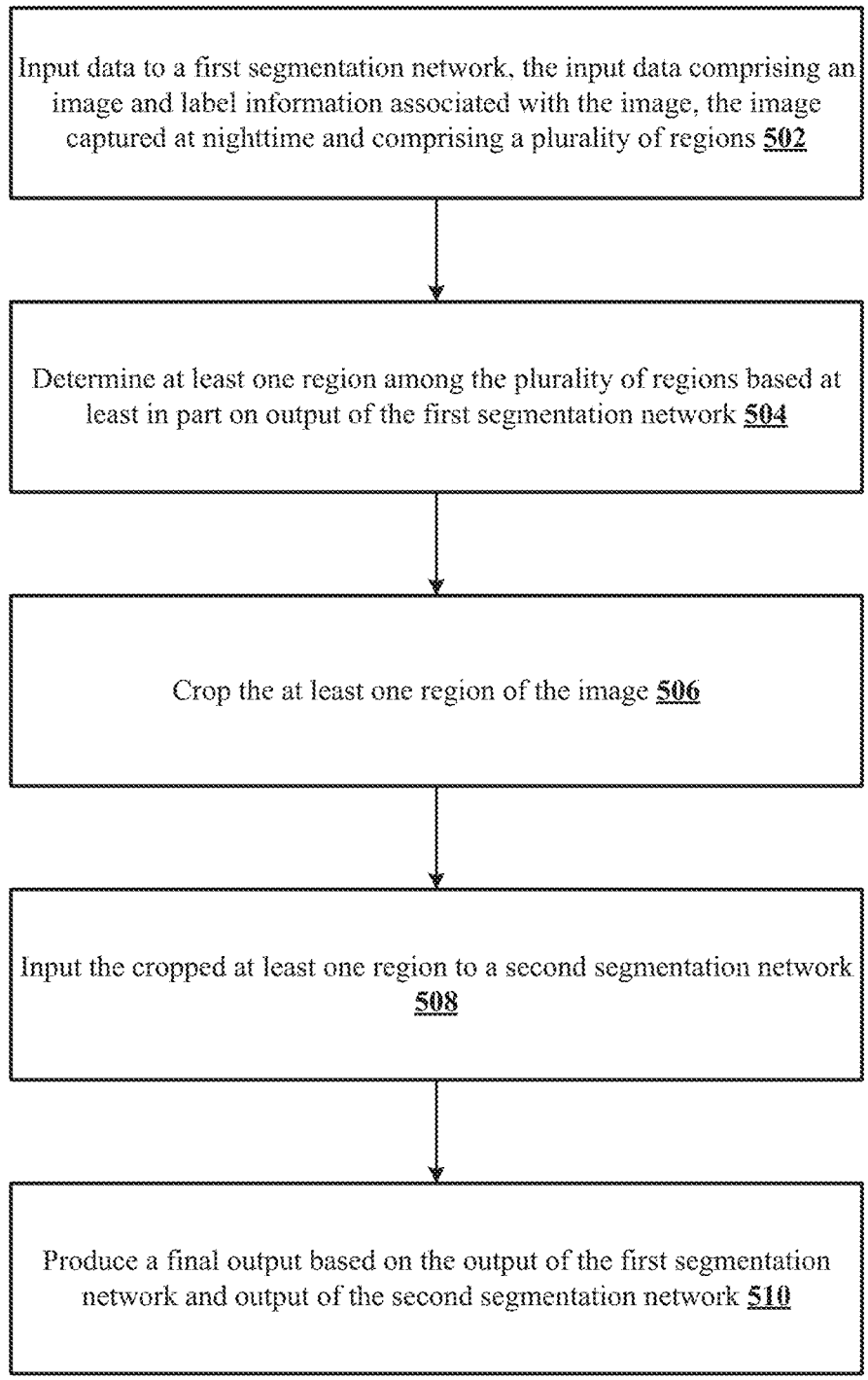
FIG. 5 shows a flow diagram illustrating a process for dual-level segmentation.

FIG. 5 illustrates an example process 500 performed by a dual-level segmentation model (e.g., dual-level model 100). The dual-level segmentation model may perform the process 500 to perform semantic segmentation, such as semantic segmentation of one or more nighttime images. Although depicted as a sequence of operations in FIG. 5, those of ordinary skill in the art will appreciate that various embodiments may add, remove, reorder, or modify the depicted operations.

As described above, the dual-level model 100 is configured to balance the easy and hard regions for nighttime data. The model 100 has two levels of granularity for tackling contextual variants. For example, the model 100 has an image level, depicted above the dashed line 141, and a region level, depicted below the dashed line 141. The image-level includes a first segmentation network (e.g., the image-level segmentation network 104). The first segmentation network 104 be optimized first in order to obtain predictions to split the classes into easy region and hard region categories.

For example, the image-level segmentation network 104 may be utilized to determine the score maps associated with an entire image set (such as a nighttime image set). At 502, data may be input to a first segmentation network. The input data comprising an image, such as from the image set, and label information associated with the image. The image may have been captured at nighttime and may comprise a plurality of regions. Given the input data, a standard supervised training pipeline may be used to optimize the first segmentation network. The output of the first segmentation network may be the scope map(s) associated with the image.

The predictions from first segmentation network may first be evaluated and, later, the evaluation scores may be ranked to find $C_{hard}$. Once these classes are determined, the regions associated with $C_{hard}$ can be grouped into instances and one or more ROIs may be determined. At 504, at least one region (e.g., ROI) among the plurality of regions may be determined based at least in part on output of the first segmentation network. As described above, semantic label maps may be used to determine and/or extract the at least one region and create the corresponding bounding boxes. Alternatively, a region detection network (e.g., region detection network 124) of the region level can be used to determine and/or extract the ROIs by grouping the classes.

The bounding boxes of the instances can be used to crop the images based on ROIs. For example, once these classes are determined, the regions associated with $C_{hard}$ can be grouped into instances and then the bounding boxes of the instances can be used to crop the images. At 506, the at least one region of the image may be cropped. For example, the region of the image that is included within the bounding box(es) may be cropped from the remainder of the image.

The cropped images may later be fed through a second segmentation network. At 508, the cropped at least one region may be input to a second segmentation network (e.g., a region level segmentation network 120). For example, in embodiments, once the boxes indicating the ROIs are cropped, the boxes (e.g., cropped images) may be zoomed-in and fed through the second segmentation network to optimize it. The second segmentation network may adopt the same network architecture as the first segmentation network and can be initialized with the weights from the first segmentation network. The results from the second segmentation network and the first segmentation network may finally be merged. At 510, a final output may be produced based on the output of the first segmentation network and output of the second segmentation network.

Figure 6:
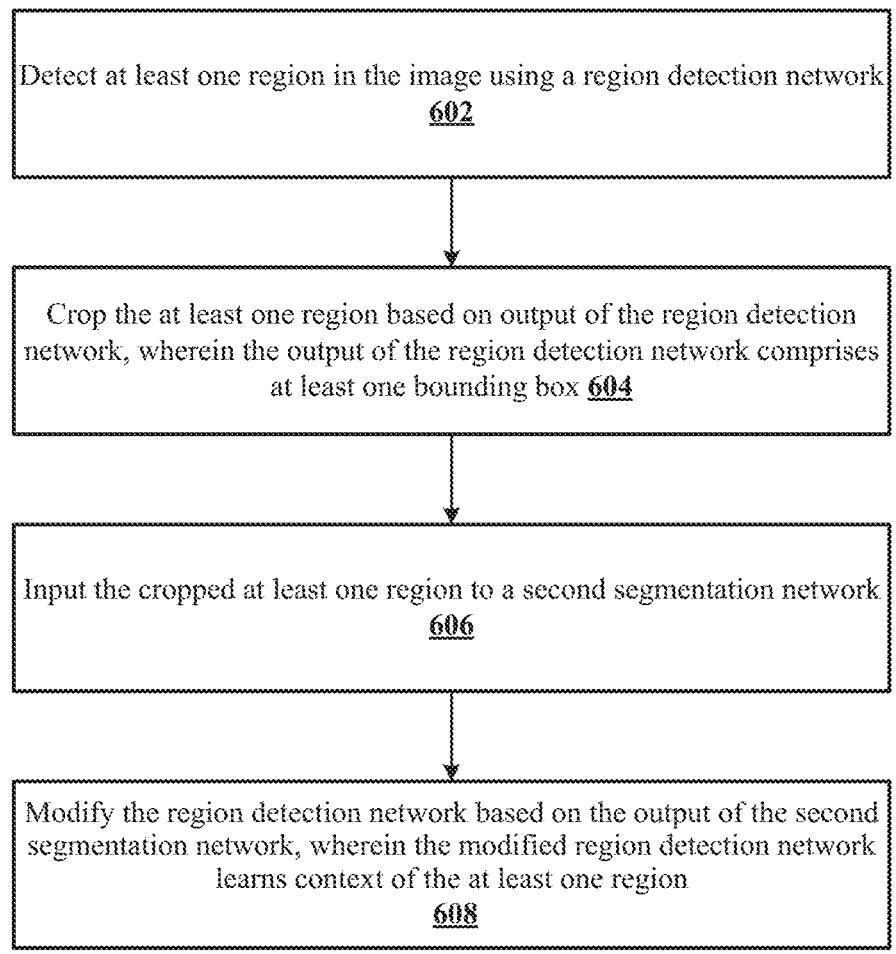
FIG. 6 shows another flow diagram illustrating a process for dual-level segmentation

FIG. 6 illustrates an example process 600 performed by a dual-level segmentation model (e.g., dual-level model 100). The dual-level segmentation model may perform the process 600 to perform semantic segmentation, such as semantic segmentation of one or more nighttime images. Although depicted as a sequence of operations in FIG. 6, those of ordinary skill in the art will appreciate that various embodiments may add, remove, reorder, or modify the depicted operations.

As described above, the dual-level model 100 is configured to balance the easy and hard regions for nighttime data. The model 100 has two levels of granularity for tackling contextual variants. For example, the model 100 has an image level, depicted above the dashed line 141, and a region level, depicted below the dashed line 141. The image-level includes a first segmentation network (e.g., the image-level segmentation network 104). The first segmentation network 104 be optimized first in order to obtain predictions to split the classes into easy region and hard region categories.

For example, the image-level segmentation network 104 may be utilized to determine the score maps associated with an entire image set (such as a nighttime image set). Data may be input to a first segmentation network. The input data comprising an image, such as from the image set, and label information associated with the image. The image may have been captured at nighttime and may comprise a plurality of regions. Given the input data, a standard supervised training pipeline may be used to optimize the first segmentation network. The output of the first segmentation network may be the scope map(s) associated with the image.

The predictions from first segmentation network may first be evaluated and, later, the evaluation scores may be ranked to find $C_{hard}$. Once these classes are determined, the regions associated with $C_{hard}$ can be grouped into instances and one or more ROIs may be determined. At 602, at least one region in the image may be detected using a region detection network (e.g., region detection network 124) of the region level. As described above, semantic label maps may be utilized to create ROIs, but the issue with this is that ground truth is not available at inference. Instead, prediction from the image level segmentation network must be used. Because the image level segmentation network 104 performs poorly with $C_{hard}$, the image level segmentation network may miss some ROIs. It is also difficult to crop the region context with inaccurate prediction boundaries. Utilizing the region detection network to determine and extract the ROIs remedies these shortcomings.

The ROI(s) may be indicated by one or more bounding boxes. At 604, the at least one region may be cropped based on output of the region detection network. The output of the region detection network comprises at least one bounding box. The cropped images may later be fed through a second segmentation network (e.g., a region level segmentation network 120). At 606, the cropped at least one region may be input to the second segmentation network. For example, in embodiments, once the boxes indicating the ROIs are cropped, the boxes (e.g., cropped images) may be zoomed-in and fed through the second segmentation network to optimize it. The second segmentation network may adopt the same network architecture as the first segmentation network and can be initialized with the weights from the first segmentation network. The results from the second segmentation network and the first segmentation network may finally be merged.

Even though the region detection network is able to detect the ROIs of $C_{hard}$, the region detection network may not be able to identify the window sizes of the ROIs to help find better context for the second segmentation network. Finding the appropriate contexts of the cropped regions is important, as the nighttime objects in a dark environment can barely be accurately estimated because the appearances are unclear. Having the contextual information can help perform dense predictions. To remedy this, the second segmentation network may be leveraged to modify the region detection network in order to automatically learn the contexts for segmenting cropped regions. At 608, the region detection network may be modified based on the output of the second segmentation network. The modified region detection network learns context of the at least one region.

Figure 7:
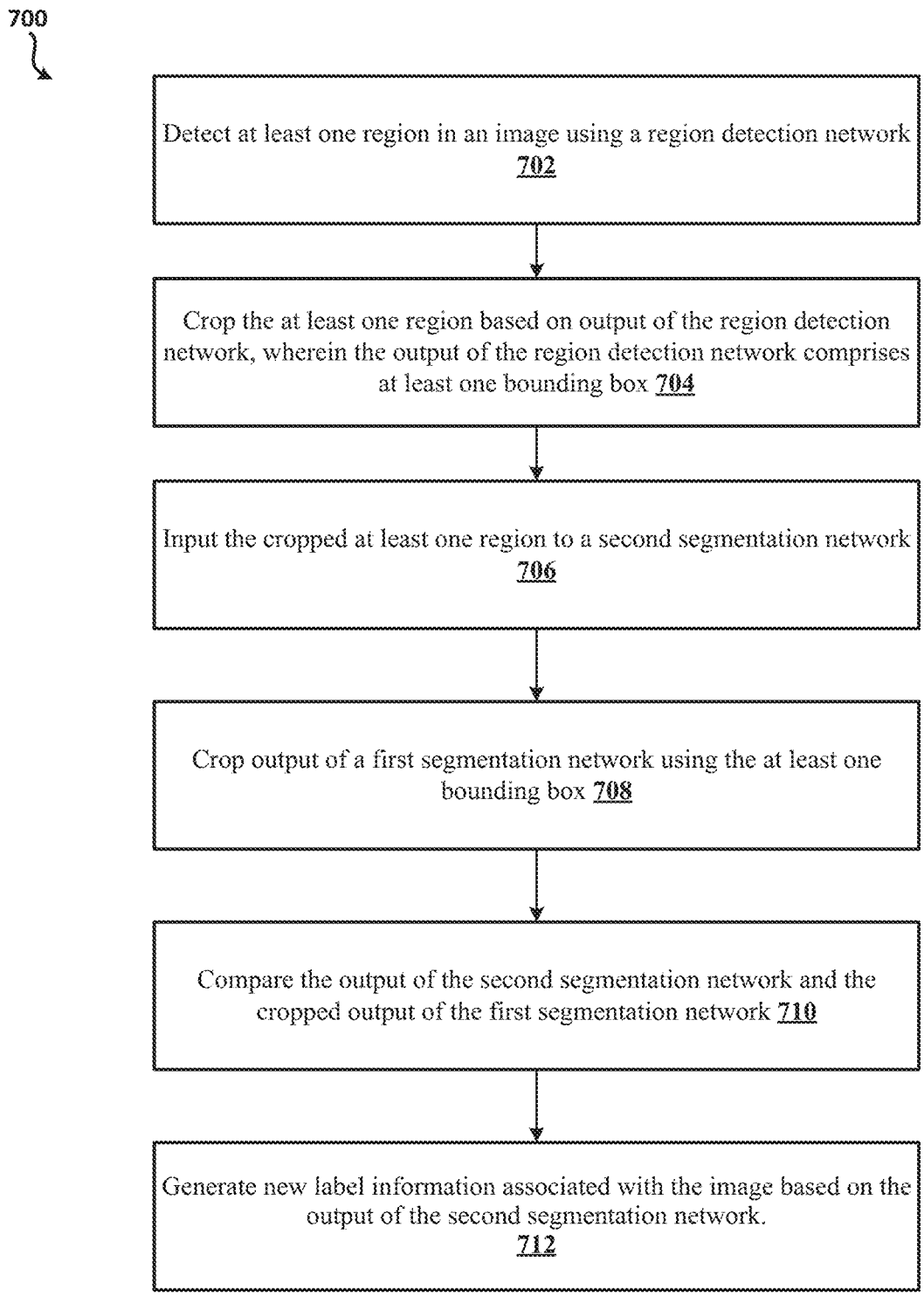
FIG. 7 shows another flow diagram illustrating a process for dual-level segmentation.

FIG. 7 illustrates an example process 700 performed by a dual-level segmentation model (e.g., dual-level model 100). The dual-level segmentation model may perform the process 700 to perform semantic segmentation, such as semantic segmentation of one or more nighttime images. Although depicted as a sequence of operations in FIG. 7, those of ordinary skill in the art will appreciate that various embodiments may add, remove, reorder, or modify the depicted operations.

As described above, the dual-level model 100 is configured to balance the easy and hard regions for nighttime data. The model 100 has two levels of granularity for tackling contextual variants. For example, the model 100 has an image level, depicted above the dashed line 141, and a region level, depicted below the dashed line 141. The image-level includes a first segmentation network (e.g., the image-level segmentation network 104). The first segmentation network 104 be optimized first in order to obtain predictions to split the classes into easy region and hard region categories.

For example, the image-level segmentation network 104 may be utilized to determine the score maps associated with an entire image set (such as a nighttime image set). Data may be input to a first segmentation network. The input data comprising an image, such as from the image set, and label information associated with the image. The image may have been captured at nighttime and may comprise a plurality of regions. Given the input data, a standard supervised training pipeline may be used to optimize the first segmentation network. The output of the first segmentation network may be the scope map(s) associated with the image.

The predictions from first segmentation network may first be evaluated and, later, the evaluation scores may be ranked to find $C_{hard}$. Once these classes are determined, the regions associated with $C_{hard}$ can be grouped into instances and one or more ROIs may be determined. At 702, at least one region in the image may be detected using a region detection network (e.g., region detection network 124) of the region level. As described above, semantic label maps may be utilized to create ROIs, but the issue with this is that ground truth is not available at inference. Instead, prediction from the image level segmentation network must be used. Because the image level segmentation network 104 performs poorly with $C_{hard}$, the image level segmentation network may miss some ROIs. It is also difficult to crop the region context with inaccurate prediction boundaries. Utilizing the region detection network to determine and extract the ROIs remedies these shortcomings.

The ROI(s) may be indicated by one or more bounding boxes. At 704, the at least one region may be cropped based on output of the region detection network. The output of the region detection network comprises at least one bounding box. The cropped images may later be fed through a second segmentation network (e.g., a region level segmentation network 120). At 706, the cropped at least one region may be input to the second segmentation network. For example, in embodiments, once the boxes indicating the ROIs are cropped, the boxes (e.g., cropped images) may be zoomed-in and fed through the second segmentation network to optimize it. The second segmentation network may adopt the same network architecture as the first segmentation network and can be initialized with the weights from the first segmentation network.

Utilizing the region-level segmentation network to help train the region detection network can facilitate the production of ROIs that cover the complete objects with contexts from $C_{hard}$. However, with the region detection network alone, multiple ROIs that have overlaps are predicted to cover only parts of one object. In order to make the region detection network predict ROIs with rich context for segmentation, the region level segmentation network may be used to reassign the labels. The images may first be cropped by the ROI outputs from the region detection network 124. The cropped images may later be fed through the region level segmentation network.

The image level segmentation mask predictions $P_j$ may be pulled, and they may be cropped by the same ROI box(es). At 708, output of the first segmentation network may be cropped using at least one bounding box. Thus, $P_j^{image}$ and $P_j^{region}$ (denoting the box) can be evaluated then compared. At 710, the output of the second segmentation network and the cropped output of the first segmentation network may be compared.

Afterwards, it can be determined if the proposed ROIs are performing better segmentation on the region-level network as compared to the image level network. Then the new label $p \in 0, 1$ may be created based on the above results followed Equation 6. At 712, new label information associated with the image may be generated based on the output of the second segmentation network. The new class labels $Y^{box}$ by Y' may then be generated. Even though the class labels are changed, the bounding box regression may be optimized as well.

Figure 8:
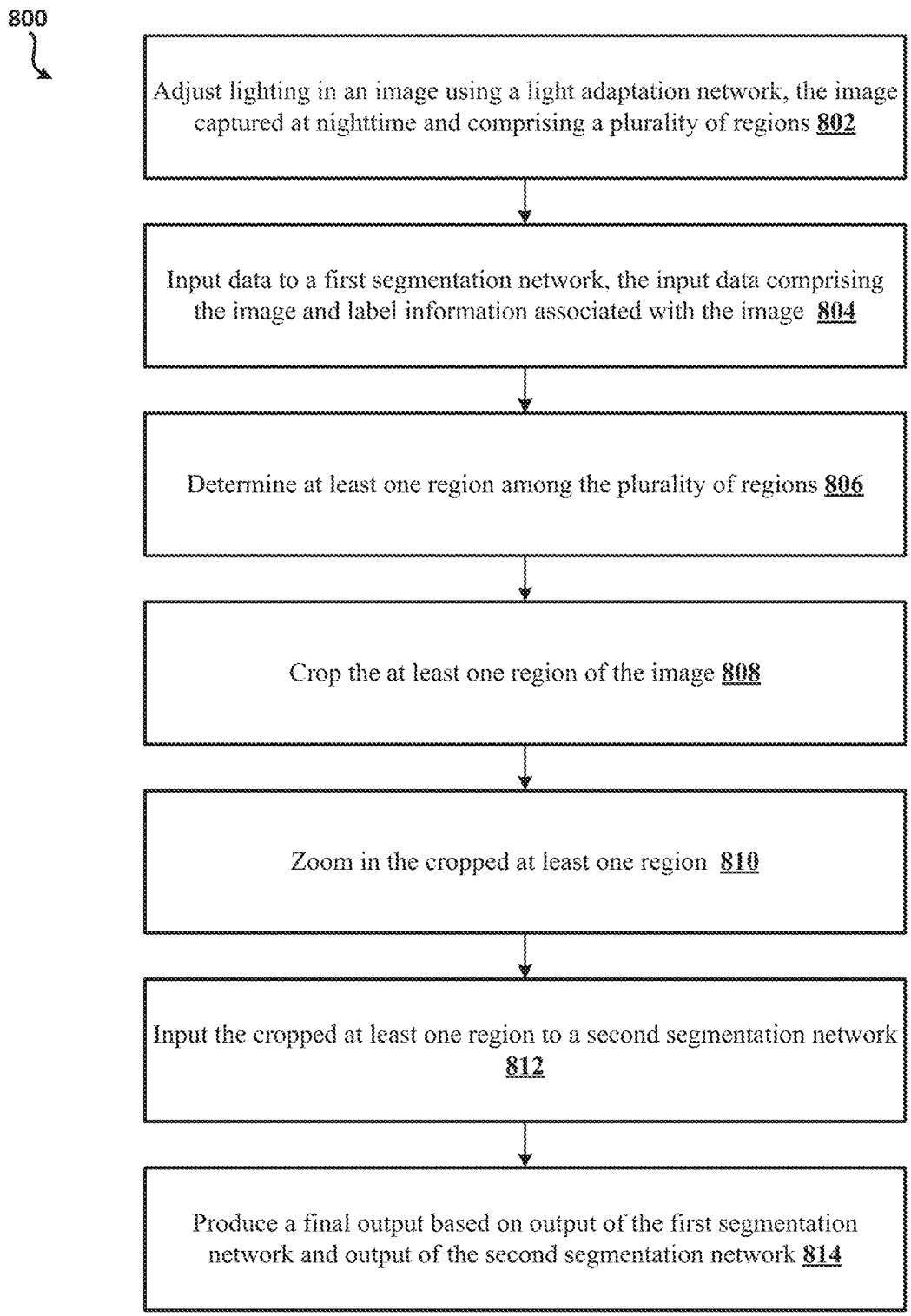
FIG. 8 shows another flow diagram illustrating a process for dual-level segmentation

FIG. 8 illustrates an example process 800 performed by a dual-level segmentation model (e.g., dual-level model 100). The dual-level segmentation model may perform the process 800 to perform semantic segmentation, such as semantic segmentation of one or more nighttime images. Although depicted as a sequence of operations in FIG. 8, those of ordinary skill in the art will appreciate that various embodiments may add, remove, reorder, or modify the depicted operations.

At 802, lighting in an image may be adjusted using a light adaptation network. The image may have been captured at nighttime and may comprising a plurality of regions. The light adaption network may be applied to regularize the darkness in the image. An image-level segmentation network may be utilized to determine the score maps associated with an entire image set (such as a nighttime image set). At 804, data may be input to a first segmentation network (e.g., image-level segmentation network 104). The input data may comprise the image and label information associated with the image. Given the input data, a standard supervised training pipeline may be used to optimize the first segmentation network. The output of the first segmentation network may be the scope map(s) associated with the image.

The predictions from first segmentation network may first be evaluated and, later, the evaluation scores may be ranked to find $C_{hard}$. Once these classes are determined, the regions associated with $C_{hard}$ can be grouped into instances and one or more ROIs may be determined. At 806, at least one region (e.g., ROI) among the plurality of regions may be determined based at least in part on output of the first segmentation network. As described above, semantic label maps may be used to determine and/or extract the at least one region and create the corresponding bounding boxes. Alternatively, a region detection network (e.g., region detection network 124) of the region level can be used to determine and/or extract the ROIs by grouping the classes.

The bounding boxes of the instances can be used to crop the images based on ROIs. For example, once these classes are determined, the regions associated with $C_{hard}$ can be grouped into instances and then the bounding boxes of the instances can be used to crop the images. At 808, the at least one region of the image may be cropped. For example, the region of the image that is included within the bounding box(es) may be cropped from the remainder of the image. At 810, the cropped at least one region may be zoomed in on.

The cropped images may later be fed through a second segmentation network. At 812, the cropped at least one region may be input to a second segmentation network (e.g., a region level segmentation network 120). For example, in embodiments, once the boxes indicating the ROIs are cropped, the zoomed-in boxes (e.g., cropped images) may fed through the second segmentation network to optimize it. The second segmentation network may adopt the same network architecture as the first segmentation network and can be initialized with the weights from the first segmentation network. The results from the second segmentation network and the first segmentation network may finally be merged. At 814, a final output may be produced based on the output of the first segmentation network and output of the second segmentation network.

To evaluate the performance of the model 100 described herein, two nighttime segmentation datasets were considered. The first data set, NightCity, is a large dataset with urban driving scenes at nighttime designed for supervised semantic segmentation, consisting of 2998/1299 train/val images with full pixel-wise annotations. The labels are compatible with Cityscapes, where there are 19 classes that we are interested in total. The second data set, BDD100K, is a large scale high-resolution autonomous driving dataset, which includes 100,000 video clips in multiple cities and under various conditions. For each video, it selects a key frame to provide detailed annotations (such as the bounding box of various objects, the dense pixel annotation, the daytime annotation, etc.). This second dataset was reorganized according to the annotation, and 27,971 night images were obtained for training, along with 3,929 night images for evaluation. 36728/5258 train/val split day images were obtained. The data split was inherited from the BDD100K dataset.

Semantic segmentation was performed on this dataset. The method was implemented with 8 V100 GPUs, with 2 image samples per GPU. In other words, the batch size was a total of 16 images. Swintransformer was applied as the baseline segmentation model. For training, the images were first scaled to the size of 1024×2048. Random scale with ratio in range of (0.5, 2.0), random flip, photo metric distortion and normalization was then applied to the images. Lastly, the images were cropped into 512×1024 before feeding through the model 100. For testing, the images were scaled to 1024×2048 with normalization and random flip. Multi-scale test was applied through all experiments.

We adopt upernet with a backbone of swin-transformer as our baseline. We investigate different sizes of swintransformer to perform nighttime segmentation and our experimental results show swin-base outperform others. Details can be found in TODO: add table. Evaluation Multi-scale test We use the default settings of mmsegmentation [2]. Specifically, the input image is first scaled to a uniform size. Multi-scale scaling and random horizontal flip are then performed on the image with a scaling factor (0.5, 0.75, 1.0, 1.25, 1.5, 1.75).

FIG. 9 illustrates a table 900. The table 900 depicts comparisons of state-of-the-art semantic segmentation networks trained with only a nighttime dataset to those jointly trained with a daytime dataset. mIoU is reported on validation set with nighttime data. The experiments were performed on Nightcity and BDD100k compared to state-of-art semantic segmentation methods. Augmentation approaches were also employed to improve the performance.

FIG. 10A illustrates a table 1000. The table 100 depicts the results of ablations studies done on the proposed baseline architectures described herein with added deformable convolution to enrich contextual features for multiscale objects. Experiments were trained on NightCity. FIG. 10B illustrates a table 1001. The table 1001 depicts the results of an ablation study for detecting and/or cropping ROIs. FIG. 11 illustrates a table 1100 depicting the results of a comparison study of augmentation approaches. FIG. 12 illustrates a table 1200 depicting per class Intersection over Union (IoU) scores. Parenthesis shows a different setting of input resolution, otherwise, original resolution is used.

Figure 13:
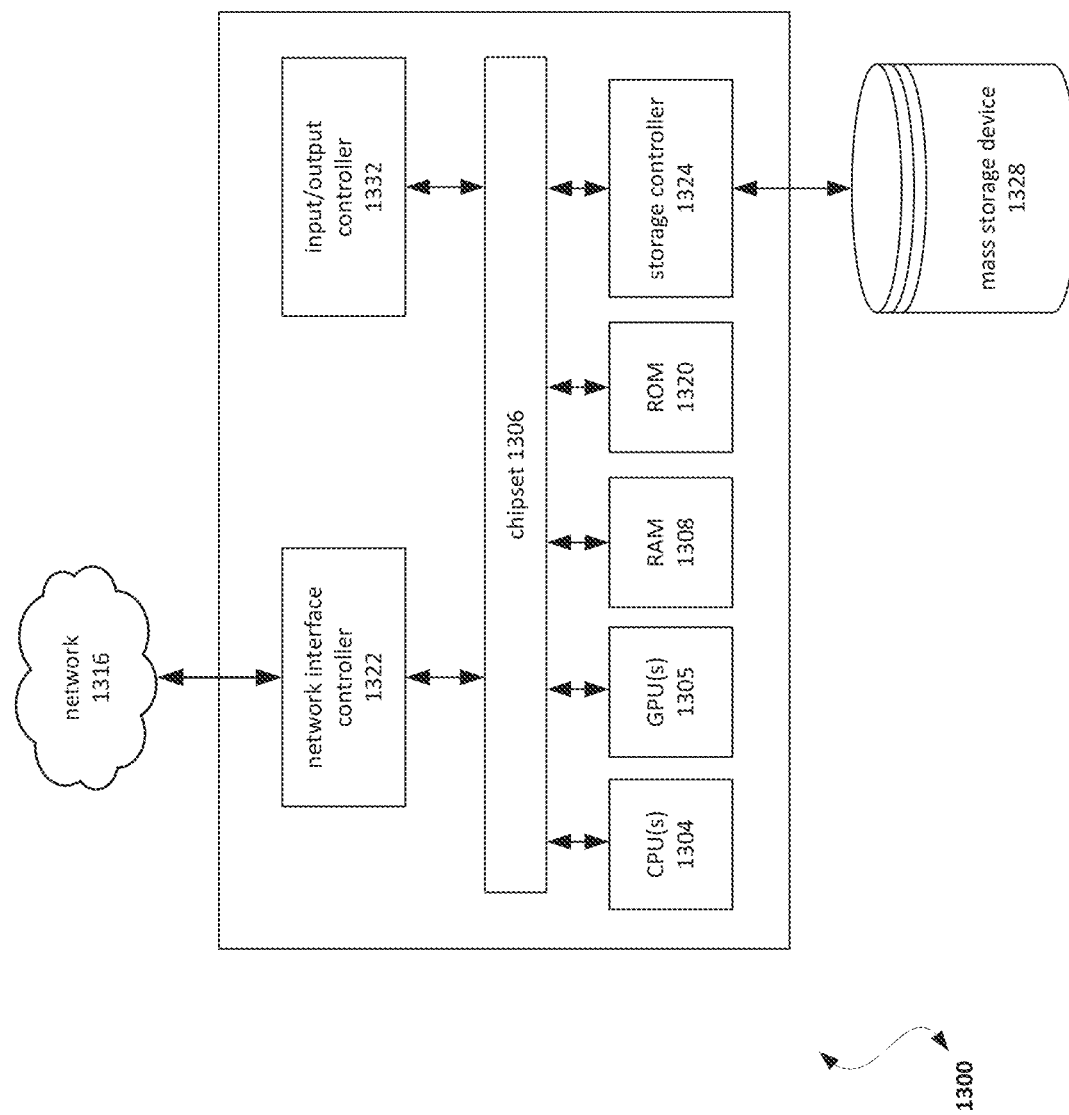
FIG. 13 shows an example computing device which may be used to perform any of the techniques disclosed herein.

FIG. 13 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s). The GPU(s) may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random-access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN). The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. The mass storage device 1328 may comprise a management component 1313. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on the mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described above. The computing device 1300 may have access to computer-readable storage media storing computer-executable instructions, which, when executed by the computing device 1300, may perform the methods described herein.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims

What is claimed is:

1. A method, comprising:
inputting data to a first segmentation network, the input data comprising an image and label information associated with the image, the image captured at nighttime and comprising a plurality of regions;
determining at least one region among the plurality of regions based at least in part on output of the first segmentation network;
cropping the at least one region of the image;
inputting the cropped at least one region to a second segmentation network;
producing a final output based on the output of the first segmentation network and output of the second segmentation network;
the method further comprises:
detecting the at least one region in the image using a region detection network; and
cropping the at least one region based on output of the region detection network, wherein the output of the region detection network comprises at least one bounding box.

2. The method of claim 1, further comprising:
modifying the region detection network based on the output of the second segmentation network, wherein the modified region detection network learns context of the at least one region.

3. The method of claim 1, further comprising:
cropping the output of the first segmentation network using the at least one bounding box;
comparing the output of the second segmentation network and the cropped output of the first segmentation network.

4. The method of claim 1, further comprising:
generating new label information associated with the image based on the output of the second segmentation network.

5. The method of claim 1, further comprising:
zooming in the cropped at least one region before inputting to the second segmentation network.

6. The method of claim 1, further comprising:
adjusting lighting in the image using a light adaptation network before inputting the data to the first segmentation network.

7. The method of claim 1, wherein the first segmentation network is incapable of predicting the at least one region with a predetermined accuracy.

8. The method of claim 1, wherein the first segmentation network and the second segmentation network each comprise a backbone of Swin transformer.

9. A computing device, comprising:
at least one processor; and
at least one memory comprising computer-readable instructions that upon execution by the at least one processor cause the computing device to perform operations comprising:
inputting data to a first segmentation network, the input data comprising an image and label information associated with the image, the image captured at nighttime and comprising a plurality of regions;
determining at least one region among the plurality of regions based at least in part on output of the first segmentation network;
cropping the at least one region of the image;
inputting the cropped at least one region to a second segmentation network; and
producing a final output based on the output of the first segmentation network and output of the second segmentation network;
wherein the operations further comprise:
detecting the at least one region in the image using a region detection network; and
cropping the at least one region based on output of the region detection network, wherein the output of the region detection network comprises at least one bounding box.

10. The computing device of claim 9, the operations further comprising:
modifying the region detection network based on the output of the second segmentation network, wherein the modified region detection network learns context of the at least one region.

11. The computing device of claim 9, the operations further comprising:
cropping the output of the first segmentation network using the at least one bounding box;
comparing the output of the second segmentation network and the cropped output of the first segmentation network.

12. The computing device of claim 9, the operations further comprising:
generating new label information associated with the image based on the output of the second segmentation network.

13. The computing device of claim 9, the operations further comprising:
adjusting lighting in the image using a light adaptation network before inputting the data to the first segmentation network.

14. A non-transitory computer-readable storage medium, storing computer-readable instructions that upon execution by a processor cause the processor to implement operations, the operations comprising:
inputting data to a first segmentation network, the input data comprising an image and label information associated with the image, the image captured at nighttime and comprising a plurality of regions;
determining at least one region among the plurality of regions based at least in part on output of the first segmentation network;
cropping the at least one region of the image;
inputting the cropped at least one region to a second segmentation network; and
producing a final output based on the output of the first segmentation network and output of the second segmentation network;
wherein the operations further comprise:
detecting the at least one region in the image using a region detection network; and
cropping the at least one region based on output of the region detection network, wherein the output of the region detection network comprises at least one bounding box.

15. The non-transitory computer-readable storage medium of claim 14, the operations further comprising:
modifying the region detection network based on the output of the second segmentation network, wherein the modified region detection network learns context of the at least one region.

16. The non-transitory computer-readable storage medium of claim 14, the operations further comprising:
generating new label information associated with the image based on the output of the second segmentation network.

17. The non-transitory computer-readable storage medium of claim 14, the operations further comprising:
adjusting lighting in the image using a light adaptation network before inputting the data to the first segmentation network.

* * * * *